US010565890B2

(12) United States Patent
Gök (10) Patent No.: US 10,565,890 B2
(45) Date of Patent: Feb. 18, 2020

(54) METHOD AND SYSTEM FOR INFORMATION EXCHANGE (71) Applicant: Metin Gök, Zürich (CH)

(72) Inventor: Metin Gök, Zürich (CH)

(*) Notice: Subject to any disclaimer, the term of this patent is extended or adjusted under 35 U.S.C. 154(b) by 169 days.

(21) Appl. No.: 15/551,153

(22) PCT Filed: Nov. 24, 2015

(86) PCT No.: PCT/EP2015/077419
§ 371 (c)(1),
(2) Date: Aug. 15, 2017

(87) PCT Pub. No.: WO2016/131507
PCT Pub. Date: Aug. 25, 2016

(65) Prior Publication Data
US 2018/0033326 A1 Feb. 1, 2018

(30) Foreign Application Priority Data
Feb. 18, 2015 (CH) .......................... 215/15

(51) Int. Cl.
G09B 5/02 (2006.01)
G09B 5/14 (2006.01)
H04L 29/06 (2006.01)

(52) U.S. Cl.
CPC .............. G09B 5/14 (2013.01); G09B 5/02 (2013.01); H04L 65/403 (2013.01)

(58) Field of Classification Search
CPC ... G09B 5/02; G09B 5/04; G09B 5/06; G09B 5/067; G09B 5/10; G09B 5/12; G09B 5/14
See application file for complete search history.

(56) References Cited

U.S. PATENT DOCUMENTS 5,239,373 A 8/1993 Tang et al.
2009/0119593 A1 5/2009 Hallock
(Continued)

FOREIGN PATENT DOCUMENTS

EP 0626636 A2 11/1994
WO 2009/058641 A1 5/2009

OTHER PUBLICATIONS

Search Report from the Swiss Patent Office dated Mar. 27, 2015 for corresponding Swiss Patent Application No. CH00215/15.
(Continued)

Primary Examiner — Omkar A Deodhar
(74) Attorney, Agent, or Firm — Walter | Haverfield LLP; D. Peter Hochberg; Sean F. Mellino (57) ABSTRACT The invention relates to a system for exchanging information, containing a first and a second station, each having a display, a camera, a spacer and a communication device connected to the display and the camera. The stations are each designed to transmit an image recorded by the camera by means of the communication devices to the respective other station and to display said image on the display of this station in a first display region. For both stations the spacer is designed for positioning the camera at a distance from a work surface, in such a way that the camera captures the work surface, and for this purpose the spacer has a base for supporting on or attaching to the work surface or to a different object, and a support, which is either connected to the base or formed integrally with it, for attaching and/or holding the camera.

13 Claims, 4 Drawing Sheets

(56) References Cited

U.S. PATENT DOCUMENTS

| | | | |
|---|---|---|---|
| 2011/0281252 A1 | 11/2011 | Pandya et al. | |
| 2012/0023407 A1* | 1/2012 | Taylor | G06F 3/04842 715/731 |
| 2015/0077614 A1* | 3/2015 | King | G03B 17/561 348/311 |
| 2016/0049082 A1* | 2/2016 | Leatherman, III | G09B 5/06 434/408 |

OTHER PUBLICATIONS

International Search Report and Written Opinion from the European Patent Office dated Feb. 5, 2016 for corresponding International Application No. PCT/EP2015/077419.

Hiroshi Ishii et al: "Iterative Design of Seamless Collaboration Media", Aug. 1994 Communications of the ACM, vol. 37, No. 8.

Andrew Busch: "D.I.Y. iPad Document Camera Stand", Oct. 9, 2013 Retrieved from Internet: http://www.andrewbusch.us/home/diy-ipad-document-camera-stand.

Anonymous: "Your iPad as a Free Document Camera", Apr. 21, 2013 Retrieved from Internet: https://appsadaisy.wordpress.com/2013/04/21/your-ipad-as-a-free-document-camera/.

Anonymous: "$10 Smartphone to digital microscope conversion!", Feb. 15, 2015 Retrieved from Internet: https://web.archive/org/web/20150215204409/http://www.instructables.com/id/10- Smartphone-to-digital-microscope-conversion/?.

Anonymous: "Cardboard iPhone 3Gs OCR (Optical Character Rcognition) Stand", Oct. 10, 2014 Retrieved from Internet: https://web.archive.org/web/20141010065007/http://www.instructables.com/id/Cardboard-iPhone-3Gs-OCR-Optical-Character-Rcogn/.

//cdn.Shopify.Com/s/files/1/0255/6693/t/2/assets/humans.Txt?843: "Justand V2 Procomputing Products", Feb. 11, 2015 Retrieved from Internet: https://web.archive.org/web/20150211232024/http://ipaddocumentcamera.com/pages/justand-v2?

* cited by examiner

METHOD AND SYSTEM FOR INFORMATION EXCHANGE

CROSS REFERENCE TO RELATED APPLICATIONS

This application is a 371 National Stage application of International Application No. PCT/EP2015/077419, filed on Nov. 24, 2015, which claims foreign priority to Swiss (CH) Application Serial No. 00215/15 filed on Feb. 18, 2015, the contents of which are incorporated herein by reference in their entireties.

BACKGROUND OF THE INVENTION

Field of the Invention

The invention relates to a system and a method for exchanging information between spatially separated persons or users. A system according to the invention and a method according to the invention can be advantageously used, for example, in distance learning, possibly in the context of school education, university education, vocational training or further education, internal company training or for the general professional exchange of information.

Description of the Prior Art

The provision of distance learning usually requires at least one camera and one spatially remote display, the camera being arranged at the location of the teacher, e.g. in a lecture hall, and the display at the location of the student, for example in a work room. In order that the teacher can observe the student in the implementation of the learning materials, cameras and displays are however often provided at both locations.

From US2012 171656 A1, for example, an example of a mobile acquisition system for use in classrooms is known. This includes a computer and a device connected thereto with a camera. Said device comprises a multi-legged stand and a hinged arm at the upper end of the same with a camera.

From WO2009 058641 A1, a system with two stations is known, wherein each station comprises a camera and a display, wherein for both stations, for example, the display has the shape of a horizontally oriented table top and the camera is directed at the display of the respective station from a distance above it. Each display screen displays the image recorded by the camera of the respective other station. To prevent adverse visual feedback effects, polarizing filters are provided in each of the displays and the cameras. A similar arrangement in this respect is also known from U.S. Pat. No. 5,239,373.

The systems known from the prior art are relatively complex, require specialized hardware and software and are therefore expensive. Due to their weight and their dimensions they are also are not readily portable, and at least in some cases require permanent or at least long-term installation in the appropriate rooms. A flexible and mobile use in any desired room, such as in an apartment or at varying locations, is therefore rarely possible.

SUMMARY OF THE PRESENT INVENTION

It is an object of the present invention to provide systems and methods for the exchange of information, which at least partly reduce and advantageously avoid the disadvantages of the prior art. The object is achieved in a general way by the subject matter of the independent patent claims. Especially advantageous embodiments and variants are derived from the dependent patent claims and the description and the figures.

DESCRIPTION OF THE INVENTION

In accordance with one aspect, the object is achieved by means of a system for information exchange containing a first and a second station. The first and the second station each have a display, a camera, a spacer and a communication device connected to the display and the camera. Such a system will hereinafter also be designated as an "arrangement".

The two stations are designed to transmit a first image recorded by the camera of the first station from the first station to the second station by means of the communication devices and to display said image in a first display region of the display of the second station, and to transmit a second image recorded by the camera of the second station from the second station to the first station by means of the communication devices and to display said image in a first display region of the display of the first station.

It applies both to the first station and the second station that the spacer is designed for positioning the camera at a distance from a work surface, in such a way that the camera captures the work surface, and for this purpose the spacer has a base for supporting on or attaching to the work surface or to a different object and a support, which is either connected to the base or formed integrally with it, for attaching and/or holding the camera. A system according to the disclosure for the exchange of information also represents an arrangement for the exchange of information, wherein the terms "system" and "arrangement" are to be understood synonymously.

Preferably, the first and second station are also designed to display the image recorded by the first camera in a second display region of the display of the first station, and to display the image recorded by the camera of the second station in a second display region of the display of the second station.

In accordance with a further aspect, the object is achieved by means of a method for the exchange of information. The method comprises the provision of a first station and a second station, wherein the first and the second station each comprise a display, a camera, a spacer and a communication device connected to the display and the camera. It also applies both to the first station and the second station that the spacer is designed for positioning the camera at a distance from a work surface, and for this purpose the spacer has a base for supporting on or attaching to the work surface or to a different object, and a support, which is either connected to the base or formed integrally with it for attaching and/or holding the camera, wherein the camera captures the work surface. The statement that the camera captures the work surface means that the camera records an image of the work surface and/or of the object which is located on the work surface (provided no other objects are located in the space between the camera and the work surface (an object to be changed can of course be placed here), as described below). In particular, the work surface can represent a (rear) boundary of a working area, in which manipulations are carried out by a user, as described below.

The method also comprises the recording of a first image by means of the camera of the first station and transmission of the first image to the second station and a display of the first image in a first display region of the display of the second station. The method also comprises the recording of a second image by means of the camera of the second station, and transmission of the second image to the first station and display of the second image in a first display region of the display of the first station.

Preferably, the method also comprises a display of the first image in a second display region of the display of the first station and a display of the second image in a second display region of the display of the second station.

Methods according to the disclosure can be implemented in particular by means of systems according to the disclosure. Therefore, any exemplary embodiments of systems disclosed define corresponding embodiments of the method at the same time, and vice versa.

In accordance with a further aspect, the invention relates to the use of the system according to the disclosure and/or to a method according to the disclosure for distance learning.

In this document, the term "user" is intended to mean a user of the system, or of a station of the system, regardless of the user's role in the implementation of the method, except where a specific role, e.g. as a teacher or student, is referred to.

In the designations of alignments, positions and orientations, the terms "horizontal" and "vertical" or "perpendicular" are used with regard to the display in relation to the orientation of the display with respect to the gravitational axis (normals). A horizontal orientation of the display corresponds to a display which is laid flat, and a vertical orientation or perpendicular orientation of the display corresponds to an upright display. The optical axis of the display plane is perpendicular to the display plane. With regard to the orientation of the camera, the terms "horizontal" and "vertical" or "perpendicular" are used with reference to the optical axis of the camera with respect to the gravitational axis.

Also, information referring to a station or to parts of a station—unless otherwise indicated—relates to the first station and/or to the second station. If a number of parts of a station are mentioned, these preferably refer to parts of the same station.

The first station and the second station are typically spatially separated in operation, for example arranged in different rooms and/or buildings.

The stations can each be designed entirely as specialized devices with corresponding electronic or computerised and mechanical elements. However, they can also be completely or partially based on standard commercial devices and components, e.g. tablet PCs, smartphones, laptops, or comparable portable computers, but also, for example, on workstations or desktop computers, etc. with the appropriate accessories. The display and/or the camera can optionally be directly integrated into these devices. In typical embodiments, the stations each comprise one computer device having one or more controllers and/or processors and corresponding software. In one exemplary embodiment, the display and the camera are designed as parts of the same portable device or computer.

A system according to the disclosure is relatively mobile compared to arrangements from the prior art and can be inexpensively implemented. In particular, as a result of the support, in some embodiments it requires no external stands, wall or ceiling mount brackets etc. Therefore, the stations of a system according to the invention can be used in virtually any room and in virtually any environment.

Due to the functionally similar structure of the first and the second station, each with a display and a camera, a system according to the disclosure and a method according to the disclosure are in particular suitable for interactive working, in which for example a user of the first station performs a task as a teacher. A user of the second station can follow the performance of the task as a student on the display of the second station, and perform or copy the individual steps virtually simultaneously, which the teacher can in turn directly monitor on the first station and if appropriate, intervene with corrective action and advice. The role of teacher and student can in principle be mixed or interchanged in any desired way. By contrast, traditional arrangements used for distance learning in a normal domestic environment are essentially designed for a unilateral "teacher-centred instruction" from teacher to student, while an image/video transmission from student to teacher, if provided at all, is only used to improve the face-to-face contact.

The fundamentally similar design of the first and second station relates primarily to the essential functionality in the context of the present invention. On the other hand, the individual elements such as the support, the display and the camera, can be designed identically or differently in both stations.

A system according to the disclosure (and a corresponding method according to the disclosure) are especially suited to corporate and academic training. It can be used, for example, in the assembly of a product, for example, to explain work steps while showing with the hands how they are to be carried out (for example how to stick something together and in what order, etc.). At the same time, the instructor can check whether the learner is performing the steps correctly and he/she can give instructions to them. The system is also suitable for home office applications, in customer service, in the hobby and leisure field, in minor operations on human and animal bodies, etc.

In addition to its use by a teacher or tutor, professor, instructor, etc.) and a pupil (or student, learners, etc.), on the basis of the previously described functional symmetry the system can also be used by users of equal status, for example, employees of a company at different sites, in different buildings etc.

The exchange of information via an arrangement according to the disclosure can therefore also take place between pupils, students, trainees or between employees. In these cases the users can assume both the role of the teacher and that of the learner, i.e. issues can be mutually explained. If a student notices, e.g. before an exam, that he/she did not understand a point, he/she can contact one or more school colleagues. Instead of exchanging e-mails with copies, photos etc., which is very time-consuming, the group of students can exchange their ideas quickly and effectively using the system. Also, a homework task can thus be solved by students together from their own homes.

In contrast to known devices for video conferences, in which the image transfer in particular is used essentially for the transmission of images of the participants (if necessary including facial expressions, gestures) to the other location or locations and at best—for example by means of special document cameras, touchscreens etc.—written, drawn or printed information can be exchanged, an arrangement according to the disclosure is in particular set up for manual operations, for example on a demonstration object.

The camera of the first and/or second station can have a photographic lens with a fixed focal length or—advantageously for displaying different sized objects—a lens of variable focal length (zoom lens), in each case designed to be focusable or for a fixed recording distance or distance range. If required, an additional optical converter or adapter can be provided, such as a wide-angle lens, or else a tele-converter or a converter with variable focal length (zoom converter), which changes the focal length of the camera lens depending on the particular task or the size of the work surface.

The (preferably at least substantially flat) work surface can be horizontally oriented. It need not necessarily be exactly horizontally aligned however, but, for example for ergonomic reasons, it can also be tilted in the manner of a console. The work surface should, however, (depending on the context and the specific application) be sufficiently horizontal that work such as writing or drawing, and if necessary assembly or adjustment work etc., can be easily carried out. Also, the work surface is preferably designed sufficiently horizontal and in such a way that objects placed on it remain in place, and do not fall off it due to the force of gravity. These considerations and guidelines for the work surface always apply, regardless of the design of the spacer. Advantageously the optical axis of the camera is also orthogonal to the work surface, or slightly inclined from the orthogonal.

The support can be constructed as a single part or of multiple parts. In the case of a multi-part structure, different sections of the support can be rigidly fixed relative to each other or be able to move in one or more degrees of freedom.

In the operating state the spacer, and in other embodiments the station as a whole, forms in one embodiment a structurally coherent unit, which a user can move or position as a whole. The station, and in particular the spacer, can be collapsed or folded together, however, and/or dismantled for storage/transport. In some embodiments, the spacer is lighter than 10, 5, 1 or 0.3 kg.

In one embodiment, both the display and the camera are held on the support and/or are resting on the support. In such an embodiment, the spacer holds both the display and the camera apart from the work surface.

In accordance with a further embodiment the display and/or the camera (individually or jointly) can be designed to be removable from the spacer and/or from the support.

In accordance with a further embodiment the display and/or the camera can be integrated or built into the support.

In other embodiments, the spacer is designed in two or more pieces and comprises a display spacer and a camera spacer structurally separate from the display spacer, the display spacer and the camera spacer being provided for separate support or mounting on the work surface. Accordingly, the display spacer then has a display support, and separately the camera spacer has a camera support. The display with the display support and/or the camera with the camera support can also form an assembly. In other embodiments, the spacer and the support are only designed for fixing and/or holding the camera, while the display is separate from these.

In one embodiment, the display and the camera are permanently and/or non-detachably connected to each other. The same can also apply to an optional microphone and/or an optional speaker.

It may be provided that the distance between the display and the camera is fixed. Alternatively however, an adjustable or variable distance can also be provided.

In one embodiment with parts that are movable relative to each other, the camera and the display can be aligned so that they are able to move relative to each other, in particular arranged such that they can be pivoted, rotated or tilted relative to each other. Alternatively however, the spacer and in particular the support, can be essentially rigid in the operating state. In some embodiments the spacer can also be dismantled for operation and/or storage.

The base of the spacer can be implemented for example from a—for reasons of mechanical stability preferably relatively heavy—stand, for example for placement on a table top as a work surface. In this case it comprises, for example, one or more pillars, which perform the function of table legs that are placed on the work surface. In other embodiments the base comprises or consists of a fixing means, for example a clamping device and/or a magnetic holder.

In one embodiment, the distance from the work area to the eye level of the user is selected, adjusted or varied according to individual visual or working comfort, and depending on the respective work to be performed, this is done either continuously or in stages. The eye-level varies from person to person. Accordingly, the distance may be e.g. between a hand's width and an arm's length. An advantageous value for the distance is 10 to 100 cm.

In one embodiment, the support is designed in two pieces, wherein a first part of the support holds the display, or the display is fixed to the first part of the support, while a second part of the support holds the camera, or the camera is fixed to the second part of the support. The first or second part of the support are in this case each separately connected to the base, either rigidly or movably.

In a further embodiment, only the first part of the support which bears or holds the display is directly rigidly or movably connected to the base or integrally implemented therewith, while the second part of the support, which bears or holds the camera, is rigidly or movably attached to the first part of the support. In such embodiments, the first part of the holder is, for example, a frame, in which the display is e.g. clamped, detachably fixed by means of rubber straps, screws or similar, or alternatively fixedly mounted, while the second part of the support is attached to this frame.

In a further embodiment, there is no functional and/or structural separation between the first part and the second part of the support.

In one embodiment, the spacer is a table, the support is a table top of the table and the table top has an opening or a transparent region, the opening or transparent region being larger than the diameter of a camera lens of the camera so that an image recorded by the camera is not, or at least not significantly, clipped by the edges of the opening or the transparent area. In operation, the spacer is placed on a work surface, which is formed by means of a further table, such as a desk, for example. As an alternative to a table however, a different—typically at least approximately horizontal—surface can also be used as a work surface, such as a floor. In such an embodiment the base is formed by the table legs of the spacer while the tabletop is used as the support.

A spacer in the form of a table can have 1, 2, 3, 4 or more legs. The distance between adjacent legs of the table can be chosen differently. A maximum distance between two legs of the table can be advantageously at least 20, 30, 40, or 50 and/or a maximum of 120, 100 or 90 centimetres. In such an embodiment the area between the plate and the work surface on which the table is positioned represents the work area in which demonstration objects are positioned and manipulated in the previously described manner. For a height adjustment, insertable table legs of different length and/or adjustable-length, e.g. telescopic, table legs can be alternatively provided.

According to one variant the spacer can also be designed (preferably in section) substantially Z-shaped or U-shaped and/or substantially have the form of a cylinder with a Z-shaped or U-shaped base surface.

It can be convenient if the spacer has 3 or more (e.g. substantially plate-shaped or rod-shaped) elements, which are connected to each other in an articulated or rigid manner. An angle between two elements connected together is preferably variable and/or fixable or invariable. A terminal element can then be pushed, for example, under a stack of books, in order to fix the spacer in its position. The other terminal link can then form the support, the terminal elements being connected via one or more additional links. Alternatively, a terminal element, e.g. if it has the shape of a plate, can be arranged such that it is resting on a work surface while the other terminal element is positioned above the first terminal element and connected thereto via one or more additional links. Then, for example a book or other demonstration object can be placed on the element resting on the work surface, which can then be optionally transported with the spacer, e.g. when a user needs to change rooms.

Regardless of the configuration of the spacer, it is advantageous if the support can be arranged at a distance from the base (and/or the work surface) that allows a user of the system and/or the method to move his/her hands and/or arms (completely or partially) under the support and/or between the support and the base (and/or the work surface) in order to change the demonstration object. For this purpose, the spacer can be designed to hold the display and the camera at a distance from the work surface of, for example, at least 5, 10 or 15 centimetres and/or a maximum of 70, 50, 40 or 30 centimetres and/or at a distance at which the display comes to rest at most at the eye level or forehead height of the user (i.e. positioned no higher than this and thus remaining visible to the user), where the distance can be selected or adjusted according to individual visual or working comfort, and where appropriate, depending on a demonstration object and/or the tasks to be completed.

It can be provided that the display, if it is held by the support, is oriented substantially horizontally or at an angle to the horizontal of, for example, less than or equal to 60, 45 or 30 degrees. A suitably selected distance to the work surface can then preferably enable the display to also remain visible to a user working with his/her hands and possibly forearms between the work surface and the support. It is also possible however, to provide an at least approximately right-angled arrangement with a substantially vertical or upright orientation of the display.

In one embodiment, in the first and/or second station the display and the camera are oriented in opposing directions, so that the optical axes of the display and camera face in opposite directions. The camera can then advantageously be arranged on the rear side of the display (i.e. on the side not intended for display).

For example, such an arrangement can be advantageously combined with a spacer in the form of a table, wherein the camera is oriented with its optical axis pointing downwards from the tabletop in the direction of the work surface and the display is visible from above to a typically seated or standing user. Alternatively, the viewing direction onto the display can also be perpendicular to the optical axis of the camera, for example, and in the operating state can project perpendicularly from the support/table top. The display can also be positioned at an angle, as described previously.

In one embodiment the support of the first and/or second station comprises a boom arm, which holds the camera at a distance from the display. In such an embodiment, e.g. a first part of the support can be formed by a frame for the display in the previously described manner, while the boom arm forms a second part of the support which protrudes from the first part of the support and the display. For ergonomic reasons the boom arm advantageously projects towards a user, and opposite to the direction of view of the user to the display, away from said display.

In one embodiment it applies to both the first station and the second station that in each case the camera captures a work area assigned to the station, the work area being bounded by means of the work surface, in particular to the rear. The work area assigned to the first station is a first work area and the work area assigned to the second station is a second work area.

In the use of such an embodiment, as explained in more detail below, a user of the first and the second station each perform a—typically manual—task in the respective work area, which a user of the respective other station can keep track of on the display of that station.

In one embodiment of a method according to the disclosure, this comprises the positioning and manipulation of a first demonstration object in the work area assigned to the first station, and a simultaneous and/or time-shifted positioning and manipulation of a second demonstration object in the work area assigned to the second station.

Preferably, the display has two display regions. A first display region then displays an image recorded by the camera of the other station, as previously described. A further second display region displays the image recorded by the camera of the same station. On this second display area the user sees what is transmitted to the other station, or that part of its work area which is visible to the local user on the display of the other station. In this way, he/she can safely control and decide what the user of the other station is supposed to see. The first and second display area can be implemented, for example, by two windows displayed side-by-side on a screen. In addition, for example the second (typically smaller) display area can be superimposed on the (larger) first display area, or overlaid on it. It is also possible in principle to provide a separate first and second display for each of the first and second display areas. The content displayed in the second display area (e.g. window) is independent of the content displayed in the first display area (e.g. window).

In one variant of such an embodiment, for at least one of the stations the second display area can be overlaid or hidden. In this way, the second display area, for example, can be displayed only for placing an object in the first display area and then be hidden again. In a further embodiment the display is designed to alternatively display the first or second display area, for example, in the largest view according to the display dimensions.

The demonstration object, to which the camera of the first station is preferably directed, can be modified optically (i.e. in its appearance). For example, an item of learning content displayed on a piece of paper, or an object arranged in the working area, for example on the work surface or between the work surface and the camera, can be modified or manipulated.

Advantageously, the appearance of the demonstration object can be varied during the recording of the image or images, or the image sequence or video recording. According to one embodiment therefore, an image sequence or video sequence (containing a first demonstration object) recorded by the camera of the first station can be displayed on the display screen of the second station in real time, and at the same time, an image sequence or video sequence (containing a second demonstration object) recorded by the camera of the second station can optionally be displayed on the display screen of the first station in real time.

Two users, each of which is seated at one of the stations, can thus collaborate and share information, for example by using a writing pad. Thus, for example, a company training course can be conducted.

In a typical application of distance learning, the demonstration object is a piece of paper, on which, for example, a computing task, a geometric construction, a grammar exercise or similar can be worked on interactively by the user of the first and second station. In another example application, the demonstration object is, for example, a technical device, an assembly or the like, which is used for training and practising such things as assembly steps, calibration and maintenance tasks, etc.

Accordingly, a demonstration object (in particular placed on the work surface), such as a text medium, can be arranged or placed between the work surface and the camera. The camera is or will be directed at the demonstration object and the display is or will be preferably directed away from the work surface and/or from the demonstration object.

The demonstration object can preferably be an information-bearing object, which contains outwardly visible displayed or displayable information that can preferably be changed. For example, the demonstration object can be a sheet of paper, a portable computer (e.g. a (further) tablet computer, smartphone, etc.) or a product or workpiece, by means of which learning content is to be communicated.

In one embodiment, for at least one station and preferably for each of the first and the second station, it is the case that the display and the work area are both visible to the user together. It is particularly advantageous if, without having to move his/her head (e.g. nodding), the user can keep both the demonstration object or the work surface and the display in view, by eye movements alone. This is not the case, for example, when using only a standard desktop or laptop computer and a known camera.

Such an embodiment is advantageous when each of the users, for example teacher and student, are each working, for example on a demonstration object, in the work area of their own station at the same time and can monitor the procedure in the work area of the respective other station without having to substantially change their viewing direction.

In one embodiment, in the first and/or second station the camera and the display are arranged relative to each other in such a way that an image displayed by the display is not captured by the camera of the same station. Accordingly, the first station and the second station can be provided in such a way that the camera of the first station does not capture the second image displayed by the display of the first station, and/or the camera of the second station does not capture the first image displayed by the display of the second station.

By using this type of arrangement, optical feedback effects, which according to the prior art have to be reduced or suppressed by elaborate additional measures, are excluded from the outset. Such an arrangement is therefore practical, in particular with regard to a robust, simple and cost-effective design. In the case of a previously described embodiment, in which the display and the camera, or the optical axis of the camera, face in different directions, this requirement is always met. If—e.g. in a camera projecting from the display on a boom arm—the viewing direction onto the display and the optical axis of the camera are perpendicular or inclined at an angle to each other, the condition can be satisfied by the appropriate choice of distance and/or tilt between the camera axis and the display using known geometrical principles.

In one embodiment the recording, transmission and display of the first and second image take place at least substantially simultaneously and in real time.

In one embodiment the first and second image are in each case a continuous video image.

It can be optionally provided that in addition to the camera described, as a part of the station an additional camera is provided, which is oriented in the opposite direction. It can then optionally be possible, with regard to the images transmitted to the other station, to switch between the two cameras, e.g. with a button press. This enables a face-to-face communication between the users of the stations.

In particular, if it is provided that the distance between the display and the camera and/or its relative orientation cannot be changed, it may be advantageous if the station comprises a reflector, in particular a mirror. The reflector is preferably designed substantially planar.

The reflector is advantageously designed and/or arranged so that light from the work surface and/or from the demonstration object (see below) is diverted by the reflector 10 to the camera and generates an image of the work surface and/or the demonstration object in the camera (see below).

An angle and/or the alignment of the reflection surface relative to the work surface and/or relative to the support can be designed either variable or constant.

In one embodiment the first and the second station also each comprise a microphone and an acoustic playback device, wherein in the following a loudspeaker is assumed, but which in principle could also be a set of headphones. The two stations in such an embodiment are designed to transmit a first tone acquired by the microphone of the first station from the first station to the second station by means of the communication devices and to reproduce said tone via the speaker of the second station, and to transmit a second tone acquired by the microphone of the second station from the second station to the first station by means of the communication devices, and to reproduce said tone via the speaker of the first station.

The acquisition, transmission and reproduction of the first or second tone preferably takes place at least substantially in real time and simultaneously with the recording, transmission and reproduction of the first and second image.

A microphone and speaker are preferably arranged in a constructional unit with the display and/or camera. In particular, the camera and/or speaker can be accommodated by the support or attached thereto.

A tone in the context of this document is essentially any sound event, in particular a voice/speech, a sound, a noise and/or a sequence or a combination of one or more of the foregoing.

The data transmission, in particular the transmission of images and/or tones between the communication devices of the stations, can be in analogue and/or digital form. A communication channel used for data transmission can comprise, depending on the design of the stations, and if appropriate depending on the application, for example a LAN/WLAN connection, a direct wireless connection e.g. using Bluetooth, and/or an internet connection via the World Wide Web.

In the method a continuous recording, transmission and output (or display) of image and/or sound as described above can be provided during a time interval 30 of at least 5, 10, 30 or 60 minutes and/or a maximum of 24, 12, 6 or 3 hours or even longer.

In accordance with a further aspect, the disclosure relates to a system for information exchange containing a first and a second station. The first and the second station each have a display, a camera, and a communication device connected to the display and the camera. The two stations are designed to transmit a first image recorded by the camera of the first station from the first station to the second station by means of the communication devices and to display said image on the display of the second station, and to transmit a second image recorded by the camera of the second station from the second station to the first station by means of the communication devices and to display said image on the display of the first station. In the first and/or second station the camera and the display are arranged relative to each other in such a way that an image displayed by the display is not captured by the camera of the same station. It is the case for each of the first and second station that the camera is spaced apart from a work surface, e.g. by means of a spacer, and the camera captures the work surface. For the work surface and its layout and orientation, the same considerations apply as described above and below in the context of other aspects. The systems for information exchange described previously and subsequently in exemplary embodiments are also implemented in accordance with this aspect of the disclosure and thus also represent exemplary embodiments for this aspect of this disclosure.

Thus, in particular in the case of a system for exchanging information in accordance with this aspect of the invention, in the previously described manner the first image can be displayed in a first display region of the display of the second station and the second image in a first display area of the display of the first station. The first image can also be displayed in a second display region of the display of the first station and the second image in a second display region of the display of the second station.

In accordance with a further aspect, the disclosure relates to a method for exchanging information.

The method comprises the provision of a first station and a second station, wherein the first and the second station each comprise a display, a camera, and a communication device connected to the display and to the camera. It applies both to the first station and the second station in each case that the display and the camera are arranged at a distance from a work surface. The first station and the second station are provided in such a way that the camera of the first station does not capture the second image displayed by the display of the first station, and/or the camera of the second station does not capture the first image displayed by the display of the second station. The method also comprises the recording of a first image by means of the camera of the first station and transmission of the first image to the second station and a display of the first image on the display of the second station. The method also comprises the recording of a second image by means of the camera of the second station, and transmission of the second image to the first station and display of the second image on the display of the first station.

Both the above general presentation of the invention as a whole and its aspects, as well as the following representation of exemplary embodiments, is largely based on an arrangement with only two stations. Of course, the system can also comprise more than two stations. To implement the method, one user per station is preferably intended, but a plurality of users per station are possible.

In such an embodiment the system for information exchange comprises a plurality of e.g. three or more stations, each station having the structure presented above and below on the basis of exemplary embodiments and providing corresponding functionalities. In such an embodiment, a plurality of stations can exchange information with each other in real time. In one embodiment, for each station the image recorded by the camera of the respective station is displayed in the second display region and the image recorded by the camera or cameras of one, a plurality of, or all of the other stations.

In one example the system consists, for example, of a first station and a plurality of second stations, wherein the image recorded by the camera of the first station is transmitted to a plurality of or all of the second stations and is displayed in the first display region of these second stations, while the second display region of the second stations according to the previous presentation in each case displays the image recorded by the camera of this second station. The first display region of the first station can display the images recorded by the cameras of the various second stations, for example, in multiple windows or in a window sub-divided into multiple parts. Alternatively or additionally, the first station can be designed to display in its first display region the image recorded by the camera of, e.g., a second station selected by the user of the first station. Such a configuration is suitable for a virtual classroom, for example, wherein the user of the first station assumes the function of the teacher and the users of the second stations each assume the role of a student.

In a variant of such a system, the individual stations can have equal status, in such a way that each of the stations can assume the role of the first station and the other stations can each represent a second station. In such an embodiment, the role of a speaker or teacher, for example, can be alternately adopted by the user of any station, while the users of the other stations each play the role of a "student".

In a further variant of a system for exchanging information having a plurality of stations, each station is designed to display the image recorded by the camera of any other station in its first display region. In this case, by means of the user interface each station can select one or more stations, whose image is to be displayed in its first display area.

In a system for exchanging information having a plurality of systems, each station can be designed to transmit an image recorded by the camera of this station to all other stations, for example, simultaneously and in real time. Alternatively, the stations can be designed to transmit an image recorded by their camera to only one or a selection of other stations. Thus, a transmission can be performed in particular to that other station or those other stations which are intended to display an image recorded by the camera of this station in the first display region of its respective display.

In a system for exchanging information having a plurality of systems, the optionally available audio transmission between the stations can be synchronized with the image transfer, for example, in such a way that the tone reproduced by a station and the image displayed in the first display region of the station originate from, or are acquired by, the same station. If according to some embodiments the image recorded by a plurality of or all other stations is displayed in the first display region, the sound signal can be selected, e.g. separately, by means of a selection via the user selection.

In a system with a plurality of users, each station can also be designed to display the images recorded by the cameras of all or a selection of other stations in their respective first display region, e.g. in each case in one window or in sub-windows according to the number of stations. A station can also be designed to display the image from the camera of another desired station in the display or its first display region in enlarged form, e.g. in full-screen format. The selection can be made—depending on the specific implementation of the station—e.g. by tapping the desired image, if the display of the station comprises a touchscreen. Alternatively or additionally, the desired image can be selected e.g. by mouse, or by entering a code individually assigned to each station, e.g. an alphanumeric code or a name individually assigned to each station.

The features described previously and subsequently in the context of concrete exemplary embodiments, unless explicitly indicated otherwise, are to be considered as preferred features, even if they are not explicitly designated as such. The features shall be disclosed both separately (as part of any system or any method) and—provided they cannot be ruled out due to the technical considerations known to the person skilled in the art—in any combination.

DETAILED DESCRIPTION OF THE PRESENT INVENTION

Examples of the invention will be explained in further detail hereafter by reference to the drawings. In these, identical or corresponding elements of different embodiments will each be designated with identical reference numerals.

Figure 1:
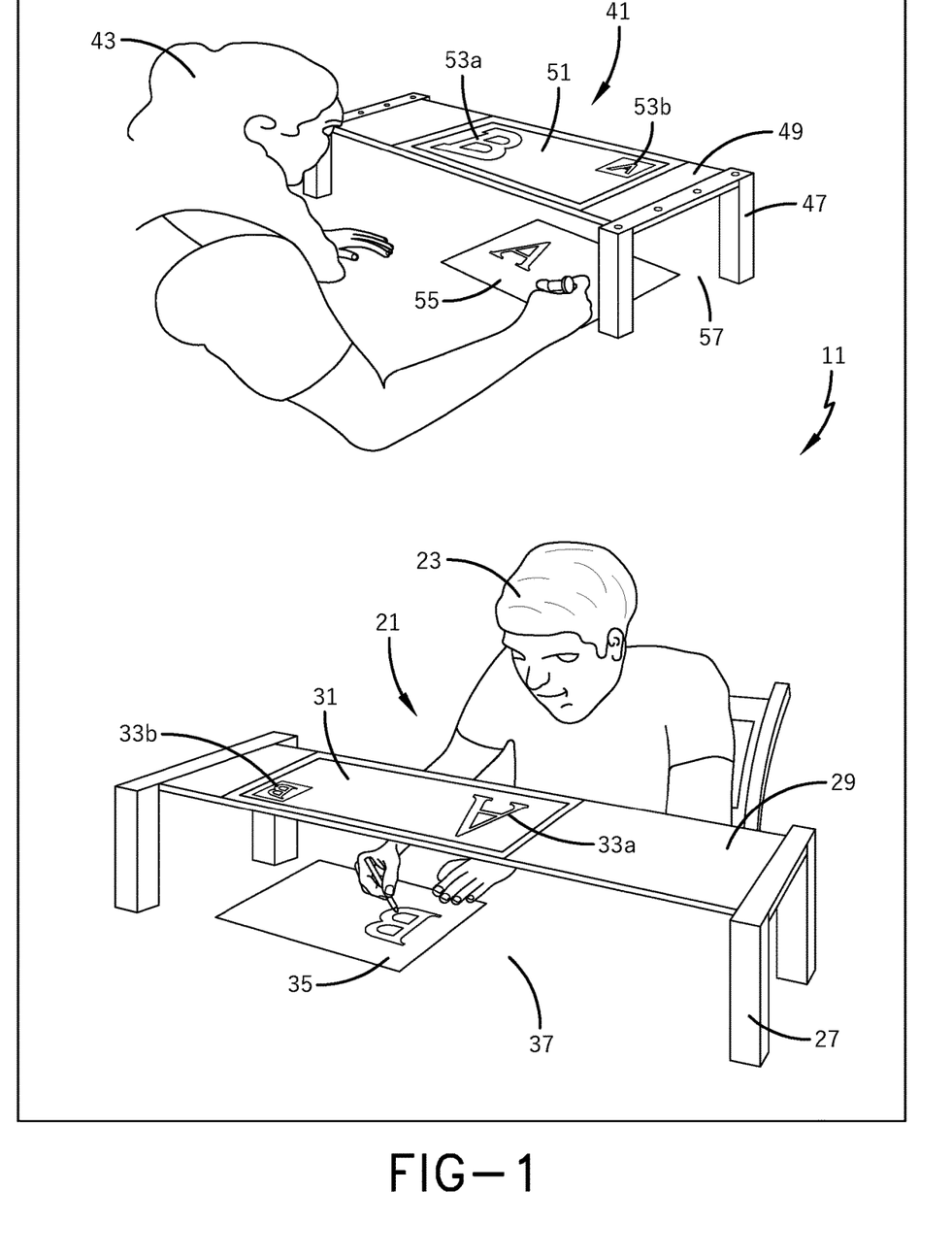
FIG. 1 shows an embodiment of a system according to the disclosure.

In the following, reference is first made to FIG. 1. FIG. 1 shows an embodiment of a system 11 according to the disclosure having a first station 21 and a second station 41, wherein systems of the type described in this document can of course also comprise more than two stations.

During operation of the system 11 the stations 21, 41 are spatially separated from each other, e.g. arranged in different buildings and/or rooms or in different parts of the same room.

Each of the two stations 21, 41 has a spacer (here in the form of a table). The spacer comprises a support 29, 49 (here in the form of a table top) and a base 27, 47 (here in the form of table legs), which are directly or indirectly connected to each other. The base, or table legs, 27, 47 can be optionally available in different lengths and in interchangeable form and/or be height adjustable, either continuously or in steps, and be able to be detached from the support 29, 49 for transport and storage.

The base 27, 47 in this case is used for supporting on a work surface 37, 57, e.g. a (writing) table-top, on which a demonstration object 35, 55 (here in the form of a writing pad) is arranged there.

Each station 21, 41 has a camera and a display, which in the present case are both parts of a tablet computer 31, 51. The support 29, 49 is designed to carry both the display and the camera and to hold them a distance away from the work area 37, 57. The distance should be dimensioned such that a user (e.g., teacher 43, student 23) can move his/her hands and/or forearms between the work surface 37, 57 and the camera and/or the display, to visually modify or manipulate the demonstration object 35, 55 which is arranged there.

If the display and the camera of the same station 21, 41 are aligned relative to each other in such a way that the viewing direction of the display corresponds to the recording direction of the camera, it can be useful if the distance mentioned is not too large, in other words if the display is fixed no higher than the eye level or forehead height of the user, to allow the display to remain visible to the person.

To implement a method for exchanging information, images of the demonstration objects 35,55 captured from the cameras in real time are exchanged between the stations 21,41, e.g. via wireless interfaces, such as Bluetooth, LAN, WLAN and/or the internet. A teacher 43 can thus modify a demonstration object 55 at the location of the second station 41, e.g. a drawing on a writing pad, where this change is brought to the attention of a student 23, who is located at the location of the first station 21.

The tablet computer 31, 51 (or alternatively, a smartphone) rests on the support 29, 49, the support 29, 49 (in the form of a table top) having an opening or a transparent region, above which the camera is arranged and through which the light from the demonstration object 35, 55 can reach the camera (the support 29, 49 could be completely or partially made of glass or any other transparent material). The camera is thus capable of recording an image of the demonstration object 35, 55 located in its detection range, and by means of a communication device, which also forms part of the station 21, 41 (in this case as part of the tablet computer 31, 51), transmitting said image to the other station 21, 41 and displaying it there on the display screen. The recording by the camera and the display on the display screen advantageously take place in real-time, but a time-delayed display is also possible.

In order to facilitate an interactive information exchange, e.g. a teaching session, it is useful if the two stations 21, 41 are programmed and/or designed to display the image (or image sequence or video sequence) recorded by the camera of the first station 21 on the display screen of the second station 41 in real time, and to display the image (or image sequence or video sequence) recorded by the camera of the second station 41 on the display of the first station 21. Thus both the teacher 43 and the student 23 can keep track of what the other person is doing in real time.

It can also be provided that the two stations 21, 41 are designed, simultaneously with the display described above, to display the image (or image sequence) recorded by the camera of the first station 21 on the display screen of the first station 21 and/or to display the image (or image sequence) recorded by the camera of the second station 41 on the display screen of the second station 41. This means that it is now possible that the users, i.e. in this case the teacher 43 and the student 23, do not have to turn their gaze away from the display to monitor what they themselves are doing.

The display of a station 21, 41 can be optionally (and independently of the design of the station) divided into each of a first display region 33*a*, 53*a* and a second display region 33*b*, 53*b*. The first display region 33*a*, 53*a* can be designed to display the image (or image sequence) transmitted by the respective other station (see above), while the additional second display region 33*b*, 53*b* can be designed to display the image (or image sequence) recorded by the camera that is assigned to the same station as the display with the corresponding display region. In this way, the user does not require a clear view of the demonstration object, or does not have to turn his/her gaze away from the display to view the demonstration object, since this also appears on the display. Depending on the particular demonstration object and the task/manipulation being performed, a direct view of the demonstration object can be advantageous however, due to the plastic or three-dimensional perception and with regard to any latency times in the presentation on the display. Also, in this embodiment the user has a precise control over what he/she shows and does not show to the user of the other station. Further aspects and variants of such an embodiment are presented in the general description of the invention.

The communication devices of the two stations 21, 41 are advantageously programmed for transmitting image information at least from the camera of the first station 21 to the display of the second station 41 and from the camera of the second station 41 to the display of the first station 21. The first and/or second station 21, 41 can also comprise a microphone and/or speaker, the communication devices then advantageously being designed for transferring sound information from the microphone of the first station 21 to the speaker of the second station 41 and/or from the microphone of the second station 41 to the speaker of the first station 21. In this way it is possible for the student 23 and the teacher 43 to hold a conversation during the teaching session (information exchange).

Figure 2:
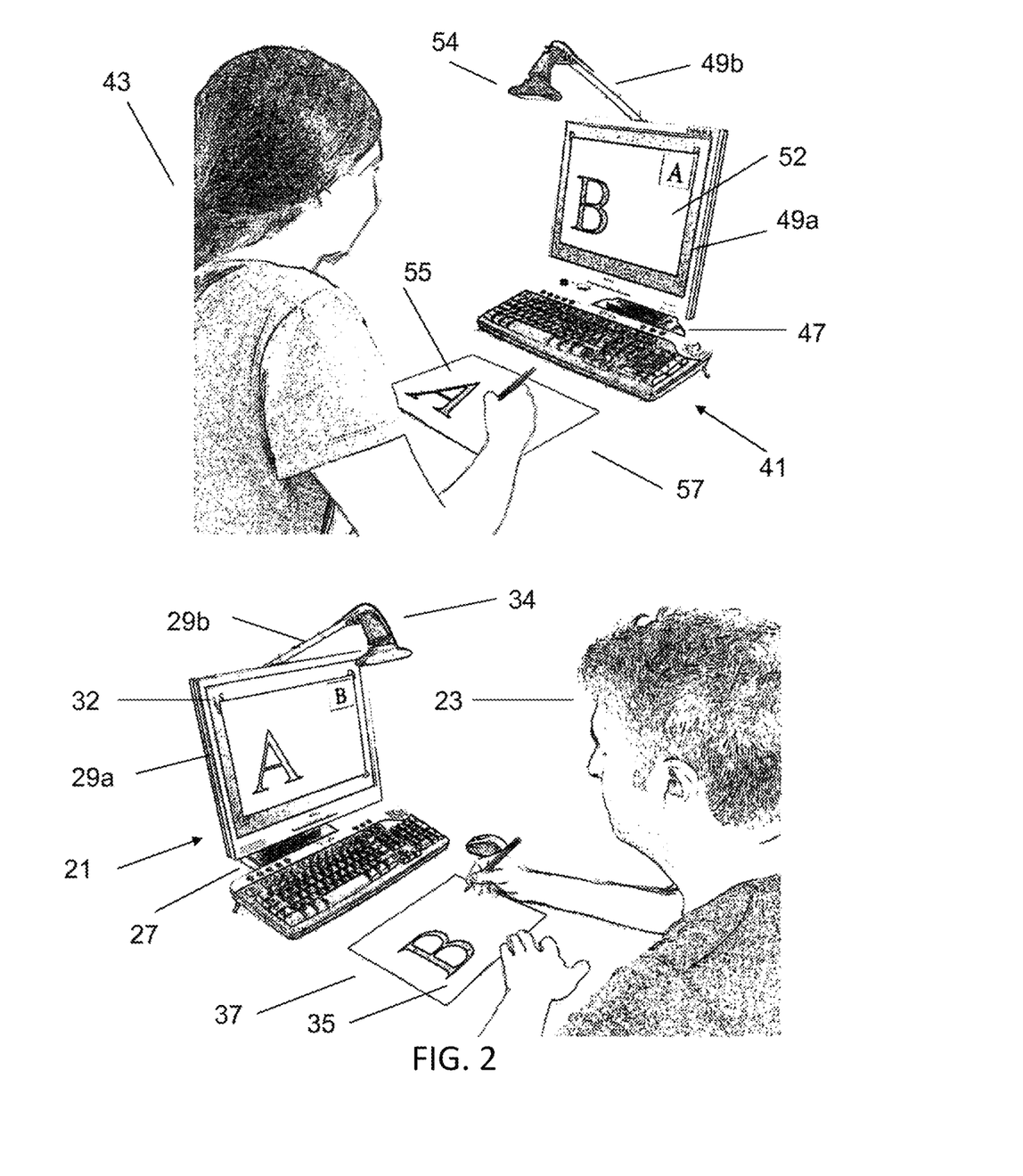
FIG. 2 shows a second embodiment of a system according to the disclosure.

In the following, reference is additionally made to FIG. 2. FIG. 2 represents a second exemplary embodiment of a system according to the disclosure. In the interest of a concise presentation, only those aspects in which the embodiment differs from the embodiment described above with reference to FIG. 1 are explained in detail.

In contrast to the embodiment according to FIG. 1, the stations 21, 41 in the embodiment according to FIG. 2 are not based on the use of tablet computers or smartphones, in which the camera and display are each oriented in opposite directions as previously described. Instead, the stations 21, 41 are implemented here as desktop computers, laptops or workstations (not shown as such) of basically known type.

The base 27, 47 of the stations 21, 41 is in each case formed by the stand 27, 47 of a monitor. A first support part 29a, 49a in the form of a frame is swivel-mounted, for example, on each stand 27, 47. For example purposes, the display 32, 52 is fixedly mounted in the frame or support part 29a, 49a of the support, but could also be detachably inserted into this, etc.

From the first support part 29a, 49a of the support—for example from the top—a boom arm projects in the direction of the user 23, 43, which represents a second support part 29b, 49b, and which on its end opposite the display 32, 52 carries the camera 34, 54. The camera 34, 54 is oriented such that its image display region captures the work surface 37, 57 located between the display 32, 52 and the user 23, 43. To this end, the optical axis of the camera 34, 54 is perpendicular to the display 32, 52 or else slightly inclined to the perpendicular. A microphone can be optionally integrated into the camera 34, 54.

The second support part 29b, 49b can optionally be movable relative to the first support part 29a, 49a in one or more degrees of freedom, e.g. it can pivot, rotate or tilt, for example by means of a hinge or universal joint. The camera 34, 54 can also be movably mounted on the second support part 29b, 49b. The second support part 29b, 49b is attached to the first support part 29a, 49a, for example by means of a clamp or a magnetic support.

Both in the arrangement according to FIG. 1 and in the arrangement according to FIG. 2, the camera and display are in each case aligned such that the image shown by the display is not captured by the camera of the same station, and therefore at least the display region of the display is outside of the recorded image region. In the embodiment according to FIG. 1, this is the case due to the opposite orientation of camera and display. In the embodiment according to FIG. 2, this is effected by a corresponding relative orientation or inclination between display 32, 52 and camera 34, 54.

A system according to the invention does not necessarily consist of two completely identically designed stations, as shown in FIG. 1 and FIG. 2. In a further alternative embodiment, e.g. one station is implemented in accordance with FIG. 1, and a second station in accordance with FIG. 2. Likewise, one or both stations can be implemented in accordance with other embodiments and/or aspects of this disclosure.

Figure 3:
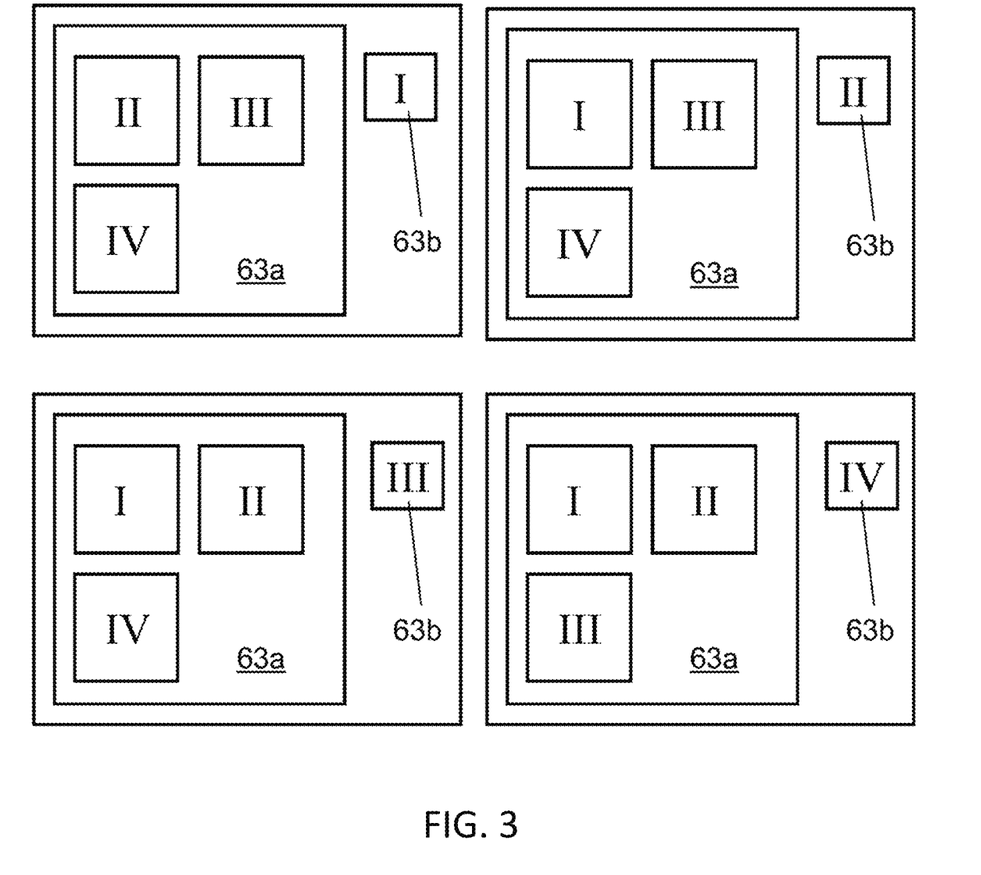
FIG. 3 shows an embodiment of a system according to the invention having a plurality of stations.

In the following, reference is also made to FIG. 3. FIG. 3 shows the images displayed by the displays of the individual stations in an exemplary arrangement with four stations, which are designated with I, II, II, IV. Each station can be implemented e.g. in accordance with the illustration of FIG. 1 or FIG. 2 or according to any other embodiment, where the different stations can be implemented identically or differently. The first display region is referenced consistently with 63a for each station, and the second display area consistently with 63b.

In each of the stations the first display region 63a is divided into a plurality of parts and/or comprises a plurality of windows, which each monitor displays images recorded by the cameras of the other stations, while the smaller display region 63b, for example, displays the image recorded by the camera of its own respective station. As explained in the general description, it is possible to hide the second display region 63b, for example, wherein e.g. the first display area 63a then occupies the entire display surface. In one exemplary embodiment, the user of each station can select one of the windows in the first display region, for example by touching via a touch screen or by mouse click, and display it in magnified form, so that it can fill the whole of the first display region 63a.

Figure 4A:
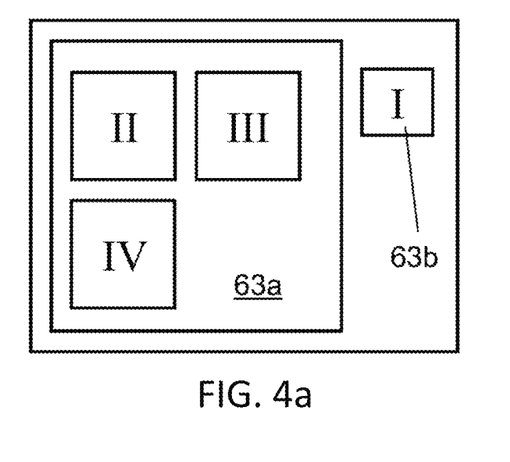
FIG. 4 shows a second embodiment of a system according to the invention having a plurality of stations.
Figure 4B:
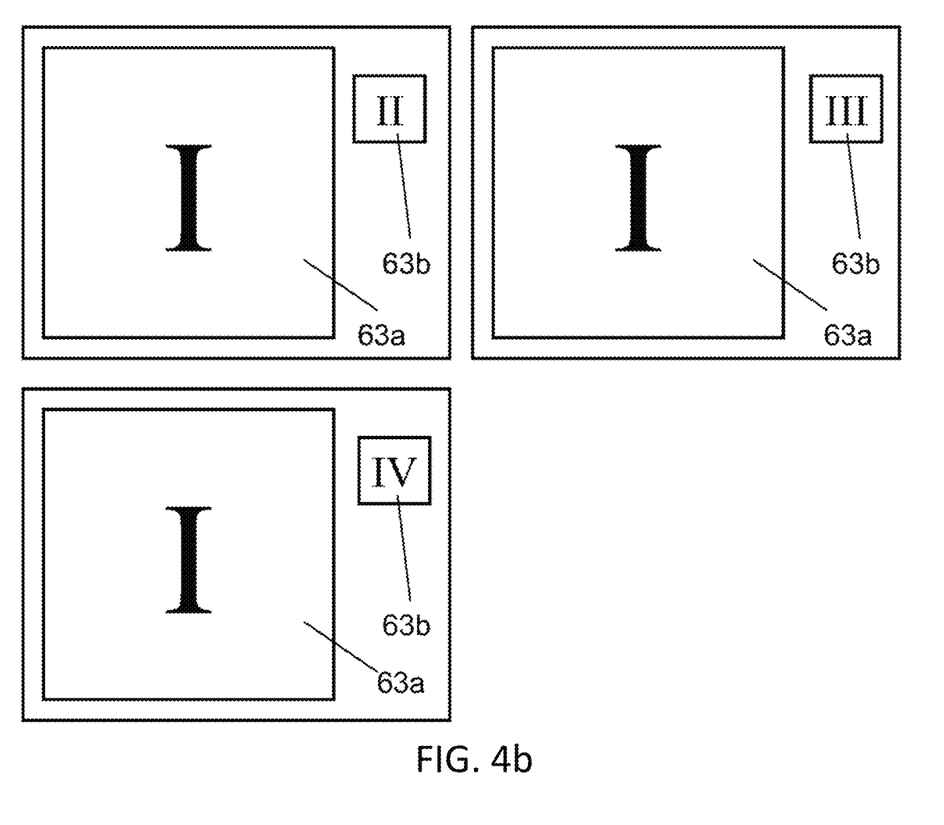

In the following, reference is also made to FIG. 4a, 4b. FIGS. 4a, 4b show the images displayed by the displays of the individual stations in a further exemplary arrangement with four stations I, II, II, IV. By way of an example, the stations are designed or configured for distance learning with a teacher or tutor and three pupils or students.

The teacher/tutor uses station I, an example of whose display image is shown in FIG. 4a. The pupils/students use the stations II, III, IV, whose display contents are shown in FIG. 4b.

In this case station I of the teacher/tutor displays, e.g., the images recorded by the cameras of the three other stations II, II, IV in the first display region 63a, in the same manner as described earlier with reference to FIG. 3. The stations II, III and IV of the pupils/students each display the image recorded by the camera of the first station I in the first display region 63a. In the second display region 63b, each station displays the image recorded by the camera of this station.

The invention claimed is:

1. System for the exchange of information, containing a first and a second station wherein
   the first and the second station each comprise:
   a display, the display having a display area;
   a camera including a lens with a lens diameter;
   a spacer; and
   a communication device connected to the display and the camera; and
   the first and second stations are each designed to transmit
   a first image recorded by the camera of the first station from the first station to the second station by means of the respective communication devices and to display said first image in a first display area of the display of the second station, and to transmit a second image recorded by the camera of the second station from the second station to the first station by means of the communication devices, and to display said image in a first display area of the display of the first station; and wherein the two stations are also designed to display the image recorded by the camera of the first station in a second display area of the display of the first station and to display the image recorded by the camera of the second station in a second display area of the display of the second station; and wherein the spacer in at least one of the first and second stations is a table, the table at at least one of the first and second stations comprising a support, the support comprising a table top of the table, and the table top including an opening or a transparent region, wherein the opening or the transparent region is larger than the diameter of a camera lens of the camera; and wherein the spacer in at least one of the first station and the second station positions the camera at a distance from a work surface in the at least one of the first and second stations, the camera in the at least one of the first and second stations being disposed to capture the work surface, and for this purpose the spacer in the at least one of the first and second stations includes a base for supporting on or attaching to the work surface or to a different object, and has a support, which is either connected to the base or formed integrally with the base, for at least one of attaching and holding the camera.

2. System according to claim 1, wherein and the camera at the second station captures a work area assigned to the second station, the work area of the second station being bounded by means of the work surface.

3. System according to claim 2, wherein at both the first and the second station that in each case the respective displays and the respective work areas are both simultaneously visible to the user at the respective work areas.

4. System according to claim 1, wherein in each of the first and second stations the camera and the display can be aligned and are movable relative to each other, in particular pivoted, rotated or tilted relative to each other.

5. System according to claim 1, wherein in at least one of the first and second stations, the display and the camera are aligned in opposite directions.

6. System according to claim 1, wherein the support of at least one of the first and second stations, comprises a boom arm holding the camera a distance away from the respective displays.

7. System according to claim 1, wherein in at least one of the first and second stations, the camera and the display are arranged relative to each other wherein an image displayed by the display of the station is not captured by the camera of the same station.

8. Method for exchanging information, comprising:
provision of a first station and a second station, wherein the first and the second station each comprise a display, a camera including a lens with a lens diameter, a spacer and a communication device connected to the display and the camera, wherein the provision of the spacer in at least one of the first and second stations is a table, the table at at least one of the first and second stations comprising a support, the support comprising a table top of the table, and the table top including an opening or a transparent region, wherein the opening or transparent region is larger than the camera lens;

wherein the spacer in both of the first station and the second station is designed in each case for positioning the camera in at least one of the first and second stations, at a distance relative to a work surface, the spacer in at least one of the first and second stations has a base for supporting on or attaching to the work surface or to a different object, and a support being either connected to the base or formed integrally with the base, for attaching and/or holding the camera, recording of a first image by means of the selected alignment of the camera of the first station and transmitting the first image to the second station and displaying of the first image in a first display region of the display of the second station, recording of a second image by means of the camera of the second station, and transmitting the second image to the first station and displaying of the second image in a first display region of the display of the first station, and displaying the first image in a second display region of the display of the first station and displaying the second image in a second display region of the display of the second station.

9. Method according to claim 8, wherein the recording, transmitting and displaying of the first and second image takes place at least substantially simultaneously and in real time.

10. Method according to claim 8, wherein the first and second image is in each case a continuous video image.

11. Method according to claim 8, wherein the camera of the first and of the second station each captures one assigned work area, wherein the work area is bounded by the working surface.

12. Method according to claim 11, said method comprising:
positioning and manipulating a first demonstration object in the work area assigned to the first station and
simultaneous and/or time-delayed positioning and manipulating at least one of simultaneously and in a time-delayed fashion of a second demonstration object in the work area assigned to the second station.

13. Method according to claim 8, and further providing in the first station and the second station in such a way that the camera in at least of the first station does not capture the second image displayed by the display of the first station and and/or the camera of the second station does not capture the first image displayed by the display of the second station.

* * * * *